(12) United States Patent
Tsuzuki

(10) Patent No.: US 7,796,281 B2
(45) Date of Patent: Sep. 14, 2010

(54) IMAGE FORMING SYSTEM HAVING REPRINT FUNCTION

(75) Inventor: Toru Tsuzuki, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 985 days.

(21) Appl. No.: 11/038,391

(22) Filed: Jan. 21, 2005

(65) Prior Publication Data

US 2005/0162691 A1    Jul. 28, 2005

(30) Foreign Application Priority Data

Jan. 23, 2004    (JP) .............................. 2004-015331

(51) Int. Cl.
    *G06K 15/00*    (2006.01)
(52) U.S. Cl. .................... 358/1.14; 358/1.15; 358/1.16; 358/1.18; 358/462; 382/176; 382/177; 382/229; 382/321
(58) Field of Classification Search ................ 358/1.13, 358/1.14, 1.15, 1.16, 402, 3.28, 538, 462, 358/464; 713/176; 400/61, 70, 76; 382/176, 382/177, 180, 190, 229, 321
    See application file for complete search history.

(56) References Cited

U.S. PATENT DOCUMENTS

| | | | | |
|---|---|---|---|---|
| 4,528,600 | A * | 7/1985 | Ishiguro et al. ............... | 386/59 |
| 5,956,471 | A * | 9/1999 | Ueda et al. .................. | 358/1.14 |
| 6,023,344 | A * | 2/2000 | Yabe ......................... | 358/1.15 |
| 6,089,765 | A * | 7/2000 | Mori .......................... | 400/61 |
| 2003/0009672 | A1* | 1/2003 | Goodman .................... | 713/176 |
| 2003/0107761 | A1 | 6/2003 | Kimura | |
| 2003/0179412 | A1* | 9/2003 | Matsunoshita ............. | 358/3.28 |
| 2003/0202208 | A1* | 10/2003 | Mellor et al. .............. | 358/1.15 |
| 2003/0231320 | A1* | 12/2003 | Tsunekawa .................. | 358/1.2 |
| 2004/0218204 | A1* | 11/2004 | Nomura ...................... | 358/1.14 |
| 2004/0218205 | A1* | 11/2004 | Irwin et al. ................. | 358/1.15 |
| 2005/0141016 | A1* | 6/2005 | Han ........................... | 358/1.14 |
| 2005/0168766 | A1* | 8/2005 | Troyansky et al. ......... | 358/1.14 |

FOREIGN PATENT DOCUMENTS

EP    613081 A1 *    8/1994

(Continued)

OTHER PUBLICATIONS

Hobbs, L.C.; Printing and Storage Peripherals: Past, Present & Future; Oct. 1984, Computer, vol. 17, Issue 10; pp. 225-241.*

(Continued)

*Primary Examiner*—Benny Q Tieu
*Assistant Examiner*—Javier J Ramos
(74) *Attorney, Agent, or Firm*—Oliff & Berridge, PLC

(57) ABSTRACT

In an image forming system in which a printing device is communicably connected to a server and a terminal, an automatic determination is performed to determine whether or not print data created by the terminal needs to be stored in a memory for placing the data in a reprintable condition. The print data stored in the memory can be reprinted without need for resending the same print data from the terminal or server to the printing device. The automatic determination is, for example, performed by referring to the header of the print data and determining whether the print data is from the terminal or the server.

28 Claims, 7 Drawing Sheets

FOREIGN PATENT DOCUMENTS

| | | | |
|---|---|---|---|
| EP | 1080930 A2 * | 3/2001 | |
| EP | 1182039 A1 * | 2/2002 | |
| JP | A-10-202987 | 8/1998 | |
| JP | A 11-027448 | 1/1999 | |
| JP | A-11-105381 | 4/1999 | |
| JP | A-11-175290 | 7/1999 | |
| JP | A 2000-177186 | 6/2000 | |
| JP | B 3139245 | 12/2000 | |
| JP | A 2001-125761 | 5/2001 | |
| JP | A 2003-177880 | 6/2003 | |

OTHER PUBLICATIONS

Hobbs, L.C.; Terminals, Nov. 1972, Proceedings of the IEEE, vol. 60, Issue 11, pp. 1273-1284.*

* cited by examiner

IMAGE FORMING SYSTEM HAVING REPRINT FUNCTION

BACKGROUND OF THE INVENTION

1. Field of the Invention

The present invention relates to an image forming system including a terminal and a printing device, and, in particular, to such a system having a reprint function.

2. Description of the Related Art

It is known in the art to use an image forming system including a terminal and a printing device communicably connected to each other. The terminal such as a server or a personal computer is provided with a transmission portion for transmitting print data to the printing device. The printing device receives the print data transmitted from the terminal and performs a print operation.

With such an image forming system, if it becomes necessary to produce the same print after the printing has ended, the application software within the terminal must be launched again and a reprint instruction must be executed. In other words, the user has to go through the tiresome procedure again of starting up the application software again, opening the file to be printed, then specifying the necessary pages.

One solution for this problem is proposed in Japanese Patent Application Publication No. 2000-177186. With this solution, the user is asked whether or not reprinting may become necessary when the initial print instruction is executed and, if the answer is affirmative, the print data transmitted to the printing device is stored in a storage device provided in the terminal. If a reprint instruction is input by the user, the print data stored in the storage device is transferred to the printing device so that the reprinting can be done.

However, the technique disclosed in Japanese Patent Application Publication No. 2000-177186 requires the user to specify whether or not reprinting may need to be performed, that is, whether it is necessary or unnecessary to store the print data, every time the initial print execution instruction is executed, which is a situation that few users would consider convenient.

SUMMARY OF THE INVENTION

In order to solve the above-described problem of the prior art, the present invention makes it possible to determine automatically whether or not reprinting is enabled, that is, whether it is necessary or unnecessary to store the print data, without an input operation by the user.

According to one aspect of the invention, there is provided an image forming system that includes a terminal, a printing device, a memory, an acquiring unit, a determination unit, a memory control unit, and a reprint instruction device. The printing device is communicable with the terminal and performs a print operation when print data is transmitted from the terminal. The acquiring unit acquires information about the print data. For example, the information acquired by the acquiring unit is source information about the terminal that has sent the print data to the printing device, or user information about a user who has prepared the print data, or data information about a data type of the print data. It is preferable that such information be written in a header attached to the print data.

The determination unit determines, based on the information acquired by the acquiring unit, whether or not to store the print data in the memory as reprint-enabled data. The memory control unit controls the memory to store the print data when the determination unit determines to store the print data in the memory. The reprint instruction device is provided for instructing the printing device to perform a reprint operation based on the print data stored in the memory.

Here, the term "print data" as used herein could be data on the print target that can be read in by printing application software and that has been converted into print data that can be subjected to print processing such as PDL (page description language) data, or it could comprise the above-described print target data itself such as ASCII codes.

With this configuration, the determination as to whether or not to store print data in the memory is done automatically, based on the information about the print data acquired by the acquiring unit. It is therefore not necessary for the user to specify whether or not to perform reprinting, i.e., whether it is necessary or unnecessary to store the print data, for each print request, as it is in the prior art configuration.

A reprint specifying device may further be included in the image forming system for accepting and retaining user's instruction as to whether or not the print data should be specified as the reprint-enabled data. When the print data is specified as the reprint-enabled data, the determination unit determines to store the print data in the memory. Accordingly, the print data thus specified by the user can also be reprinted without need for launching the application software again.

The acquiring unit may search a specific character string from the text portion of the print data. In this case, the determination unit determines to store the print data in the memory unless the specific character string is present in the text portion. For example, the print data cannot be stored in the memory for reprinting if the print data includes keywords such as "company confidential", thus preventing the execution of the reprint function.

The determination of whether or not the reprint function is executed can also be based on whether or not the specific character string or desired key information is or is not included.

According to another aspect of the invention, there is provided a printing device that includes a print portion, a memory, an acquiring unit, a determination unit, a memory control unit, and a reprint instruction device. The printing device is communicable with a terminal, and the acquiring unit acquires information about print data transmitted from the terminal. The determination unit determines, based on the information acquired by the acquiring unit, whether or not to store the print data in the memory as reprint-enabled data. The memory control unit controls the memory to store the print data when the determination unit determines to store the print data in the memory. The reprint instruction device instructs the print portion to perform a reprint operation based on the print data stored in the memory.

According to still another aspect of the invention, there is provided a terminal communicable with a printing device. The terminal includes a memory, an acquiring unit, a determination unit, a memory control unit, and a reprint instruction device. The acquiring unit acquires information about print data to be transmitted to the printing device. The determination unit determines, based on the information acquired by the acquiring unit, whether or not to store the print data in the memory as reprint-enabled data. The memory control unit controls the memory to store the print data when the determination unit determines to store the print data in the memory. The reprint instruction device instructs the printing device to perform a reprint operation based on the print data stored in the memory.

According to yet another aspect of the invention, there is provided a reprint execution program for an image forming system including a terminal, a printing device that is communicable with the terminal and performs a print operation when print data is transmitted from the terminal, and a memory. The reprint execution program includes an acquiring program, a determining program, a memory control program, and an instruction program. The acquiring program is for acquiring information about the print data. The determining program is for determining, based on the acquired information, whether or not to store the print data in the memory as reprint-enabled data. The memory control program is for controlling the memory to store the print data when the determining program determines that the print data is to be stored in the memory. The instructing program is for instructing the printing device to perform a reprint operation based on the print data stored in the memory.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
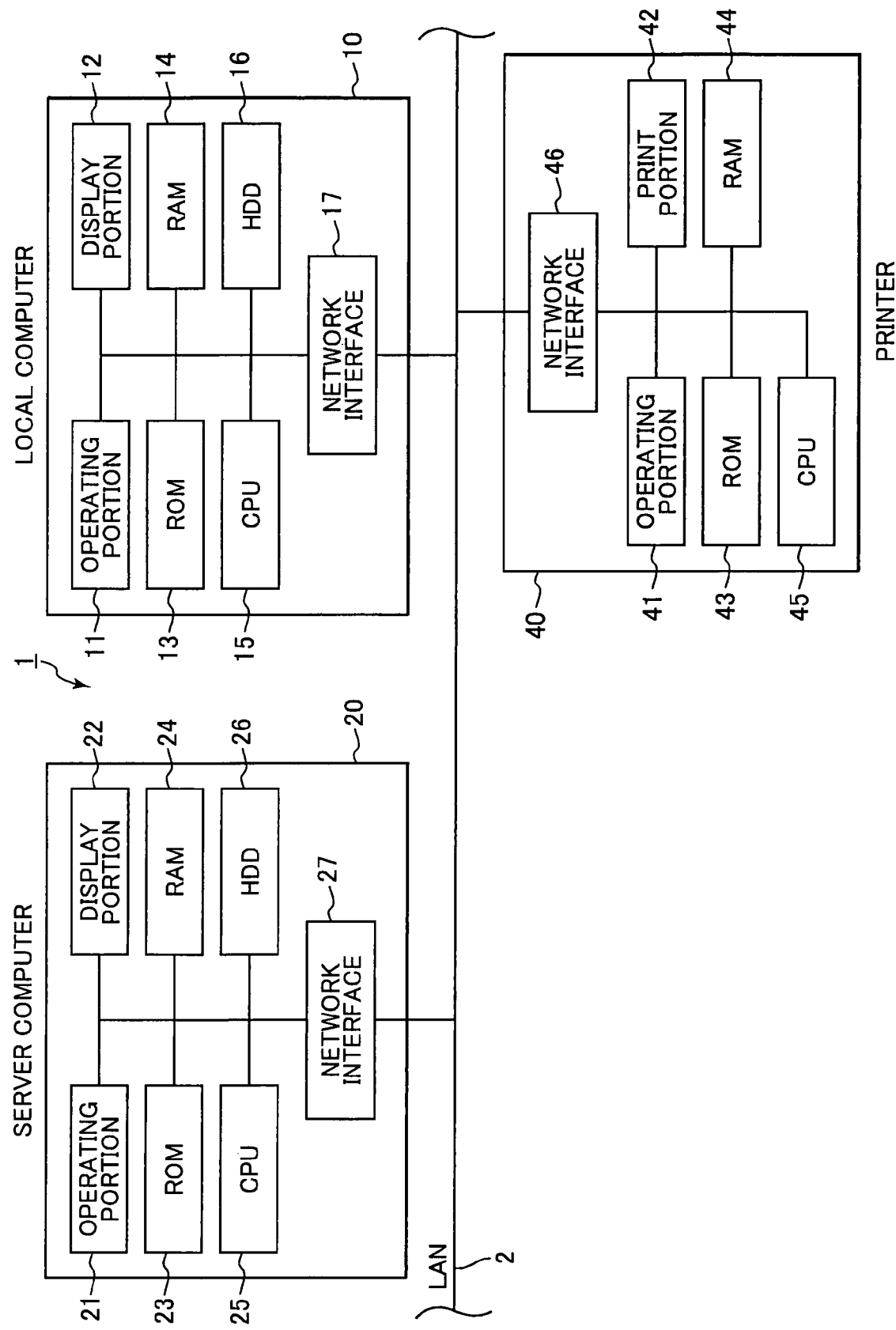
FIG. 1 shows the overall configuration of a network system applicable to first and second embodiments of the invention.

A first embodiment of the invention will now be described with reference to FIGS. 1 to 6. FIG. 1 shows a hardware configuration of a network system 1. This network system 1 is used as an image forming system in the first embodiment.

In the image forming system 1, a plurality of local computers 10 (although only one is shown in FIG. 1) and a server computer 20 are communicably connected to a printer 40 by a local area network (LAN) 2 so that data can be transferred therebetween. Each local computer 10 serves as a terminal. The image forming system 1 is provided with a reprint function that enables reprinting of the same data that has already been used to print in response to a print request, without launching the application again, as will be described later.

Each of the local computers 10 and the server computer 20 is configured of an operating portion 11 or 21 that accepts input operations from an external device such as a console, a display portion 12 or 22 that displays information, ROM 13 or 23, RAM 14 or 24, a CPU 15 or 25, a hard disk 16 or 26, and a network interface 17 or 27. Application software for generating the data to be printed and a printer driver is stored in the hard disk 16 or 26, and the application software or printer driver is read out from the hard disk 16 or 26 in accordance with a startup instruction from the above-described operating portion 11 or 12, and is launched.

When a print request instruction is received from the operating portion 11 or 21 due to an input operation by the user, print target data that has been generated by the application software is delivered to the printer driver. In this case, expansion (conversion) processing is done to convert the data into PDL data that can be subjected to print processing, then the data is transmitted through the network interface 17 or 27.

Note that each of the local computers 10 is used by users, but the server computer 20 is designed to manage the storage of data such as software and files used in common by those users, for supply to the local computers 10. Each user's input operation could of course be through a graphical user interface, in addition to key input from a keyboard or the like.

The printer 40 is provided with an operating portion 41 that receives an input operation from the outside such as an operating panel provided on the main unit of the printer 40, a print portion 42 that prints onto paper as a recording medium, ROM 43, RAM 44, a CPU 45, and a network interface 46. The CPU 45 subjects the PDL data that has been received from the local computer 10 or the server computer 20 through the network interface 46 to printer language processing (PDL processing), and transfers the result to the print portion 42. The print portion 42 executes a print operation to print data corresponding to the above-described print target data onto the paper, based on the thus sent data (hereinafter, this print operation in response to a print request is called a "normal print operation").

Figure 2:
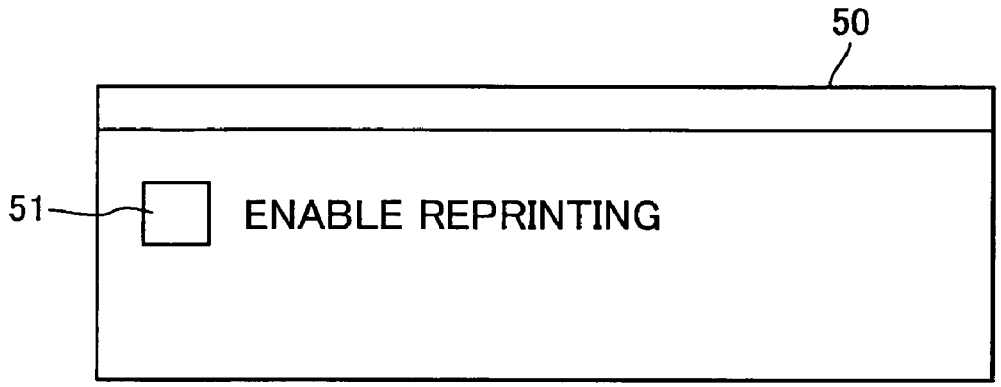
FIG. 2 shows a screen for allowing the user to specify whether reprinting is to be performed.

With this embodiment of the invention, the local computer 10 and the server computer 20 are each configured to be able to handle the above-described specification that enables reprinting (print data storage specification) in answer to the user's input operation. More specifically, a window screen 50 for a graphical user interface can be displayed on the display portion 12 or 22, as shown in FIG. 2, by selecting a print menu from the application software. The configuration is such that the specification that enables reprinting is executed by specifying a selection button 51 in that window screen 50, by a console operation such as using a mouse. Note that this menu can be used when the application starts up and the user specifies his or her own intentions before the first print request.

Figure 3:
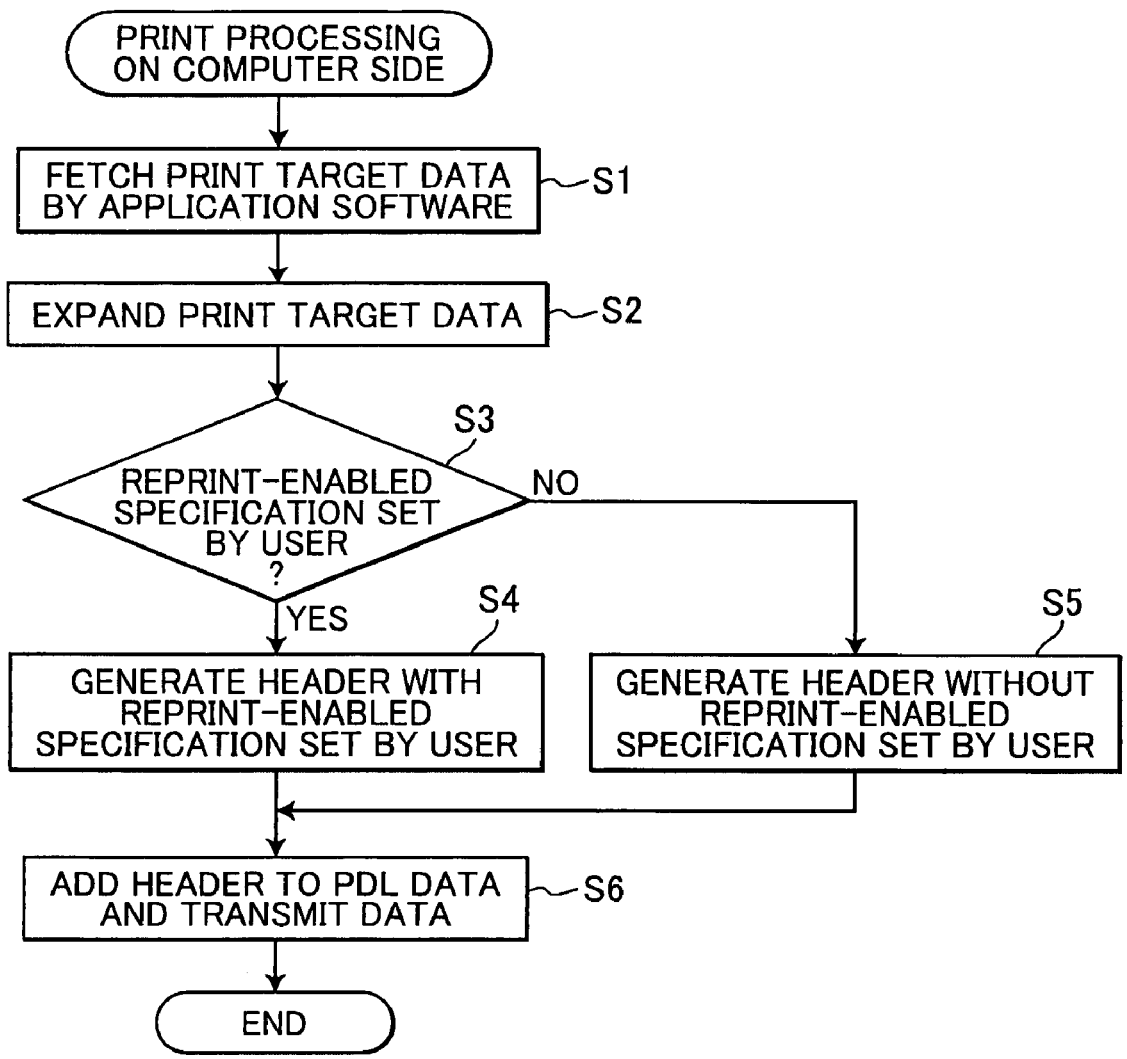
FIG. 3 is a flowchart of print processing on the computer side in accordance with the first embodiment of the invention.

The description now turns to the print processing on the local computer 10 and the server computer 20 sides, with reference to the flowchart of FIG. 3.

When a print request is selected from the print menu of the application software, the CPU 15 or 25 execute the control shown in the flowchart of FIG. 3. The CPU 15 or 25 starts up the printer driver and fetches the print target data from the application software at step S1, then expands that print target data into PDL data at step S2. In step S3, it determines whether or not there is a reprint-enabled specification set by the user as described above and, if there is such a specification (step S3: Yes), it generates a header in which is written the reprint-enabled specification set by the user (step S4).

If there is no reprint-enabled specification set by the user (step S3: No), on the other hand, it generates a header that does not have a reprint-enabled specification set by the user (step S5). Next, the header generates at step S4 or S5 is added to the above-described PDL data in step S6, and is transmitted as data through the network interface 17 or 27.

Note that the above-described header contains not only data such as the transmission destination information and application name relating to the printer 40 that is the transmission destination, but also data such as ID information that indicates whether the transmission source is the server computer 20 or the local computer 10 (source information), storage source information for the print target data, the user name for the print target data (user information), the data type (data information), and the date and time when the print request was issued.

Figure 4:
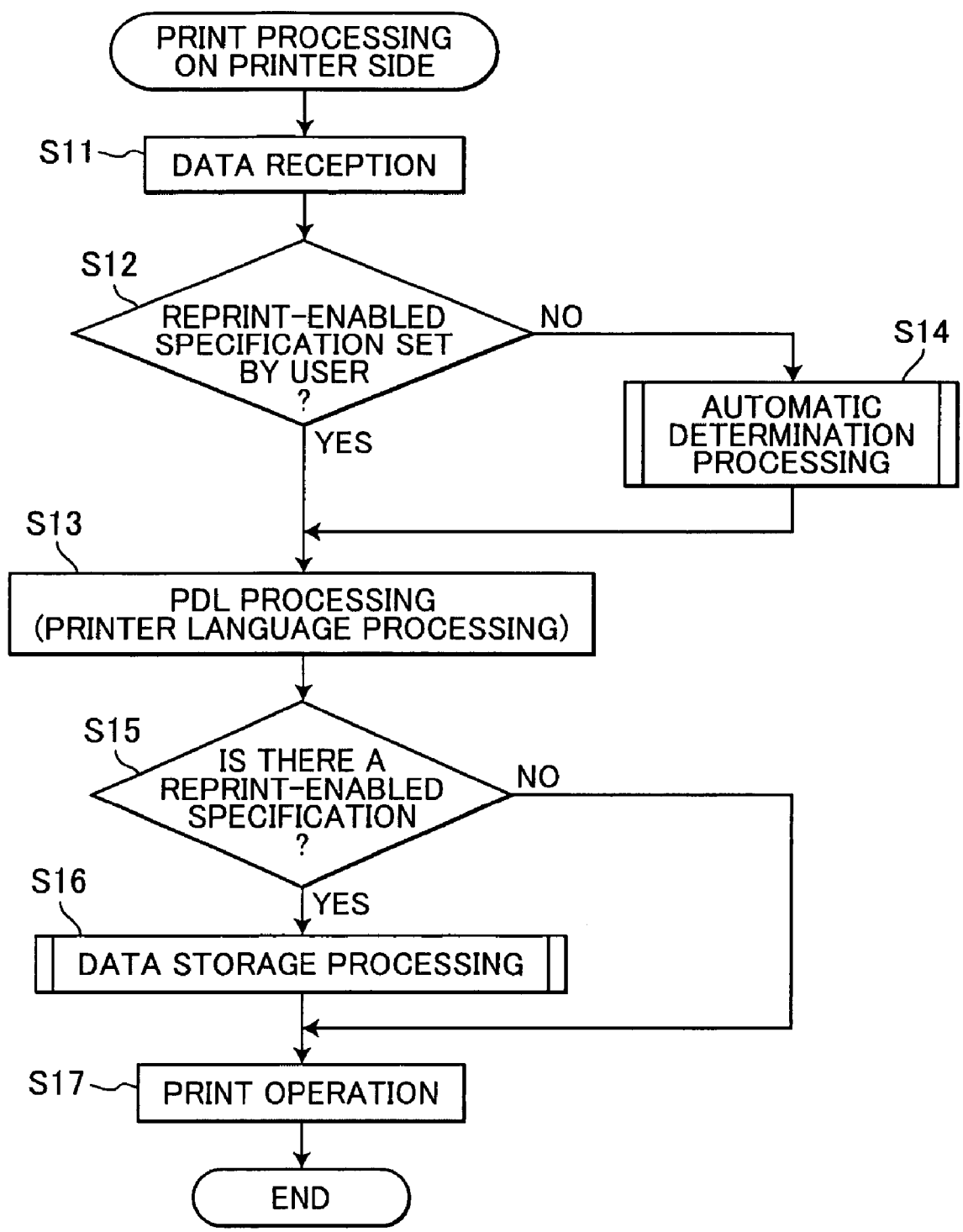
FIG. 4 is a flowchart of print processing on the printer side in accordance with the first embodiment of the invention.

The description now turns to the print processing on the printer 40 side, with reference to the flowchart of FIG. 4.

When a data transmission signal is received from the local computer 10 or the server computer 20, the CPU 45 executes control as shown in the flowchart of FIG. 4. First of all, the CPU 45 sequentially receives the above-described PDL data in step S11. It then determines whether or not the reprint-enabled specification set by the user is written into the header that is attached to the PDL data, in step S12. If there is the reprint-enabled specification set by the user in this case (step S12: Yes), the processing proceeds straight to step S13.

If there is no reprint-enabled specification set by the user (step S12: No), on the other hand, the CPU 45 executes automatic determination processing at step S14. More specifically, the following processing is executed, by way of example.

The CPU 45 fetches the transmission source information or storage source information that is written into the header. Then, the CPU 45 performs processing for a reprint-enabled specification when the transmission source or storage source is the server computer 20. On the other hand, the CPU 45 does not specify reprint-enabled when the transmission source or storage source is the local computer 10.

In other words, the server computer 20 is generally used in common by a plurality of users for storing common files, so it is likely that another user will want to print from print data that has been requested by a specific user. Therefore, the necessity of executing the reprint function will be high. In contrast thereto, print data that is transmitted from the local computer 10 is often related to information that is personal or highly confidential, so the necessity of executing the reprint function will be low. Thus this processing is designed to automatically determine whether or not there is a reprint-enabled specification, from that viewpoint.

The CPU 45 may fetch the user name that is written in the header, and performs processing to not specify reprint-enabled if this is the specific user name or specify reprint-enabled if this is any other user name. If the users include people who handle highly confidential data and users who do not handle such data, it is also possible to automatically determine whether or not to specify reprint-enabled in accordance with the name of the user that requested the printing of the print target data.

The CPU 45 may fetch the data type that is written in the header, and performs processing to automatically determine whether or not to specify reprint-enabled in accordance with that data type.

Note that the configuration could be such that the determination processing executes any one step alone of the above-described steps, or any two of the steps. The configuration could also be such that the execution of this processing can be set selectively.

Figure 5:
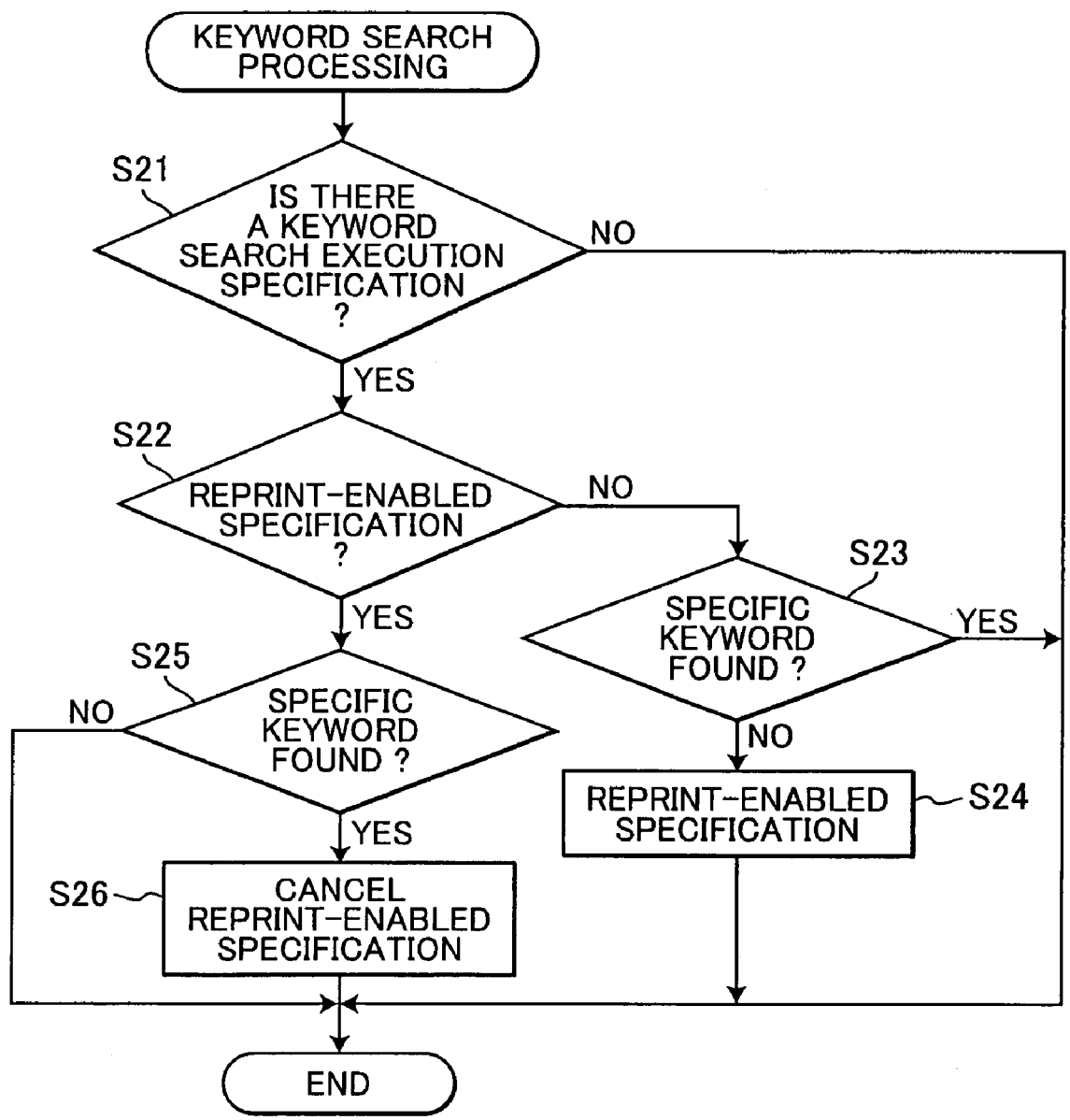
FIG. 5 is a flowchart of keyword search processing in accordance with the first embodiment of the invention.
Figure 6:
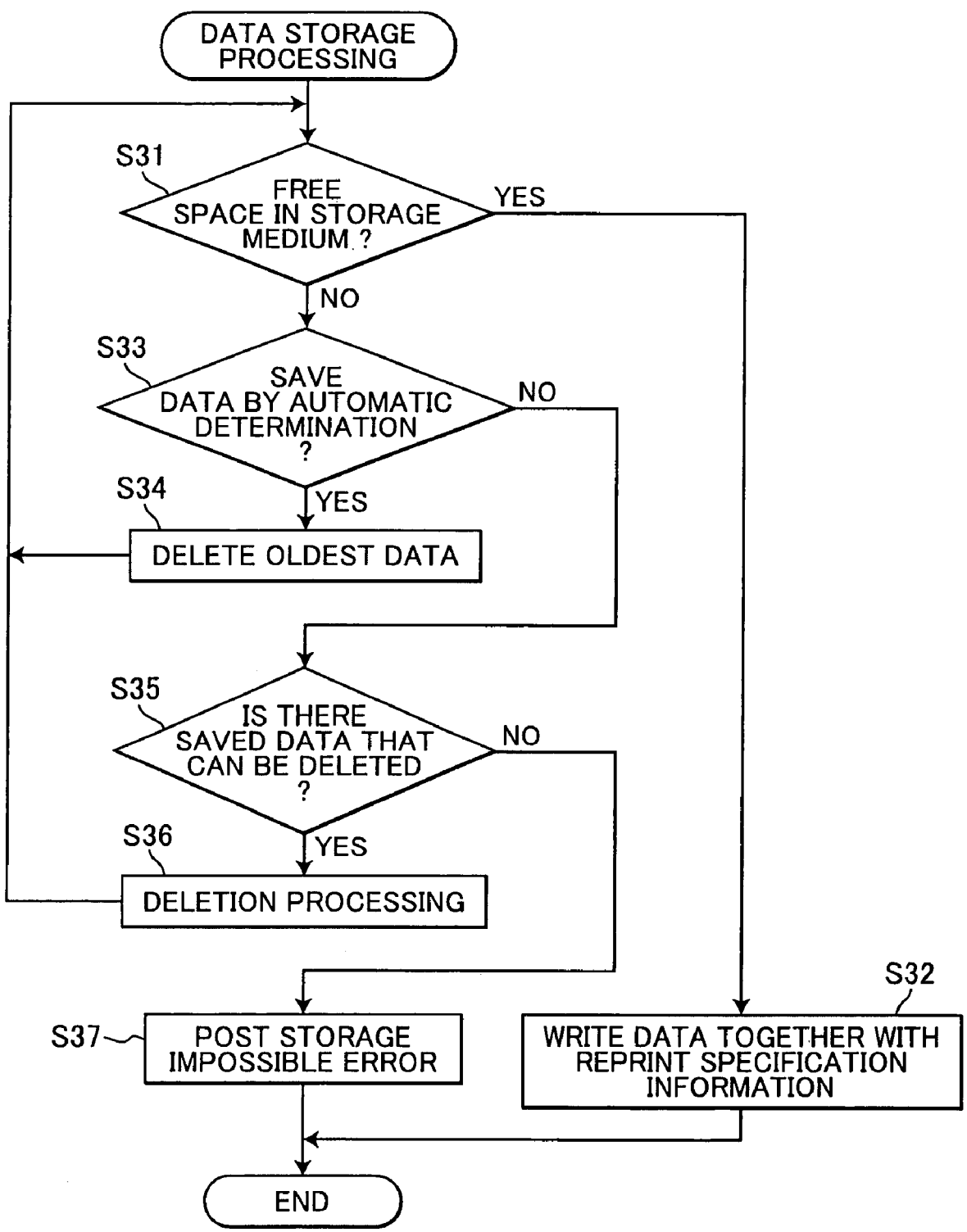
FIG. 6 is a flowchart of the data storage operation in accordance with the first embodiment of the invention.

The CPU 45 then executes the printer language processing of step S13. With this embodiment, the keyword search processing of FIG. 5 is concurrently executed during this printer language processing. In other words, processing to search for specific keywords such as "company confidential" is done in step S13 if there is reprint-enabled specification set by the user beforehand and the above-described automatic determination processing has been executed in step S14.

In the keyword search processing of FIG. 5, it is first determined in step S21 whether or not there is a keyword search execution specification. If there is a keyword search execution specification (step S21: YES), then judgement in step S22 is executed. On the other hand, if there is no keyword search execution specification (step S21: NO), then the keyword search processing is hereby ended.

In step S22, it is determined whether or not there is a reprint-enabled specification. Judgement executed in step S22 is "NO" when reprint-enabled specification is not set during the automatic determination processing in step S14. That is, judgement in step S22 is "NO" when prescribed pieces of information that allow the reprint-enabled specification to automatically set are not contained in the header of the PDL data as a result of automatic determination processing in step S14. In step S23, it is determined whether or not the specific keyword of "company confidential" is contained in the PDL data. If this specific keyword is not contained in the PDL data (step S23: NO), then the reprint-enabled specification is set (step S24). If, on the other hand, the specific keyword of "company confidential" is contained in the PDL data (S23: YES), then the keyword search processing is hereby ended without performing reprint-enabled specification in step S24.

Judgement executed in step S22 is "YES" when reprint-enabled specification was automatically set in the automatic determination processing in step S14 and also when the user set reprint-enabled specification beforehand. In step S25, it is determined whether or not the above-described specific keyword of "company confidential" is contained in the PDL data. If this specific keyword is contained in the PDL data (step S25: YES), then the previously set reprint-enabled specification is cancelled (step S26). If, on the other hand, the specific keyword of "company confidential" is not contained in the PDL data (S25: NO), then the keyword search processing is hereby ended while leaving the previously set reprint-enabled specification valid.

After execution of the keyword search processing of FIG. 5, the flow proceeds to step S15 of FIG. 4, where it is determined whether or not there is a reprint-enabled specification. If there is no reprint-enabled specification (step S15: No), the PDL data is passed to the print portion 42 without modification and the above-described normal print operation is executed (step S17). In contrast thereto, if there is a reprint-enabled specification (step S15: Yes), a data storage operation is executed at step S16 and then the above-described normal print operation based on the PDL data is executed (step S17).

The description now turns specifically to the data storage operation in this case. At step S31 in FIG. 6, the CPU 45 determines whether or not there is sufficient free space in the storage medium such as the RAM 44 for storing the PDL data that is the current storage target. If there is sufficient free space (step S31: Yes), the above-described PDL data is stored in the RAM 44 together with the reprint specification information (such as ID information indicating whether this specification was set by the user or by the automatic determination processing) (step S32).

If there is no free space (step S31: No), on the other hand, it is determined at step S33 whether or not there is data that has been stored for a reprint-enabled specification set by the automatic determination processing (including the above-described keyword search processing), within the data stored in the RAM 44. If there is such data (step S33: Yes), the flow proceeds to step S34 to execute delete processing. If there is a plurality of sets of data stored by the automatic determination processing in this case, the deletion is done by a priority set by the oldest data, based on the information indicating the date and time of storage in the RAM 44, by way of example. This processing is done until the predetermined free space can be ensured within the RAM 44. Note that the configuration could also be such that the data to be deleted is selected on the basis of the print request date and time information for the requested print, which is written into the above-described header.

If step S33 finds no data that has been stored by the automatic determination processing in the RAM 44, or if the result of the deletion processing of step S34 is that there is no such data and there is still is insufficient free space, the system determines in step S35 whether or not there is data that can be deleted among the data that has been stored by user specification, based on the above-described transmission source information or user name. If there is such data, the system deletes it (step S36).

If there is no such data, by some chance, and it is still not possible to ensure enough free space (step S35: No), a storage impossible error is posted at step S37. Details of this posting could be displayed as error information on the operating panel of the printer 40 or the display portion 12 or 22 of the local computer 10 to the server computer 20, or error information could be printed out onto paper by the print portion 42 of the printer 40. Alternatively, the error information could be posted by a voice message.

After the printing in accordance with the initial print request ends, reprint processing can be executed on the basis of that PDL data, by selecting the PDL data that has been stored in the RAM 44 by a predetermined operation on the operating panel of the printer 40. Note that the configuration could also be such that the selection of the above-described PDL data is enabled on condition that a predetermined password is input.

With the first embodiment, the determination of whether or not to store PDL data is done by the above-described automatic determination processing or keyword search processing, to enable the execution of the reprint function. It is therefore not necessary for the user to specify whether or not reprinting is to be enabled, i.e., whether it is necessary or unnecessary to store the print data, at each print request, as in the prior art configuration described previously.

Since the configuration is such that PDL data that has been stored by automatic determination processing or keyword search processing is deleted in a specific sequence in order to ensure sufficient free space in the RAM 44, the user can execute reprinting of the remaining PDL data that has been stored, in sequence.

With the first embodiment, the configuration is such that the PDL data is stored in the RAM 44 within the printer 40 and reprinting can be done by an operation from the operating panel, so that the reprint function can be implemented just by processing on the printer 40 side.

The setting of the reprint-enabled specification (the PDL data storage specification) can be based on whether or not a desired keyword is found by keyword search processing.

The first embodiment is configured so that the print target data is expanded into page description language (PDL) and then stored. When reprinting is to be done, the reprinting can be executed on the basis of the previously expanded PDL data, enabling a shortening of the processing time of the initial print execution that is equal to the time that would be taken by that expansion processing.

Next, a second embodiment of the invention will be described with reference to FIGS. 7 and 8. In the first embodiment described above, automatic determination processing was done on the printer 40 side, but with the second embodiment, the configuration is such that the automatic determination processing is executed by a printer driver on the terminal side, that is, in the local computer 10 or the server computer 20. In this case, the description below deals only with differences from the first embodiment with further description of components with the same reference numbers being omitted.

Figure 7:
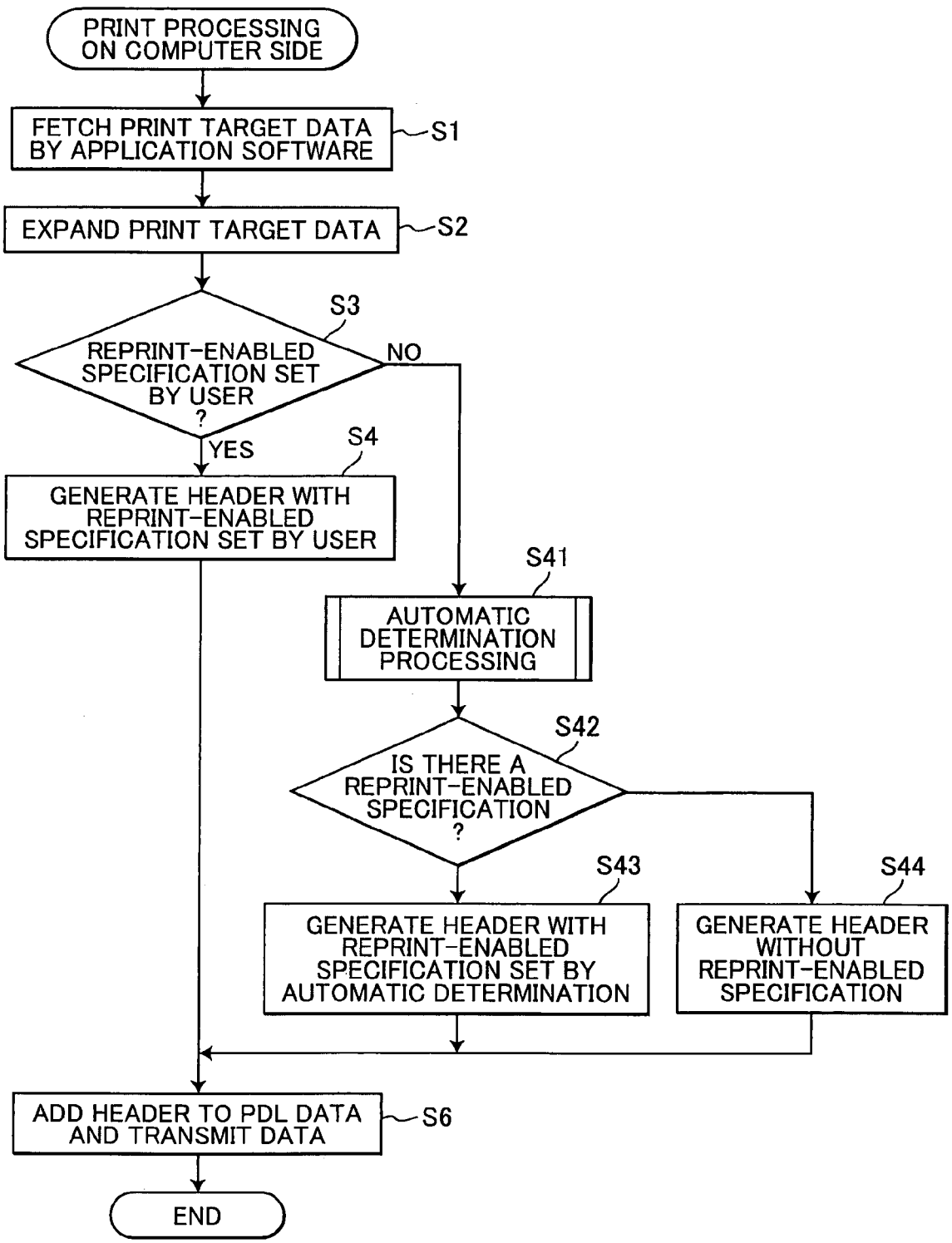
FIG. 7 is a flowchart of print processing on the computer side in accordance with the second embodiment of the invention.

If there is no reprint-enabled specification set by the user at step S3 of FIG. 7 (step S3: No), automatic determination processing is executed at step S41. Details of this automatic determination processing are substantially the same as those of the automatic determination processing (step S14) on the printer 40 side in the first embodiment. As a result, a header containing the reprint-enabled specification set by the automatic determination is generated for PDL data for which reprint-enabled is specified, or a header with no reprint-enabled specification is generated for PDL data that does not have a reprint-enabled specification (steps S42 to S44). In step S6, the PDL data with attached header is transmitted.

Figure 8:
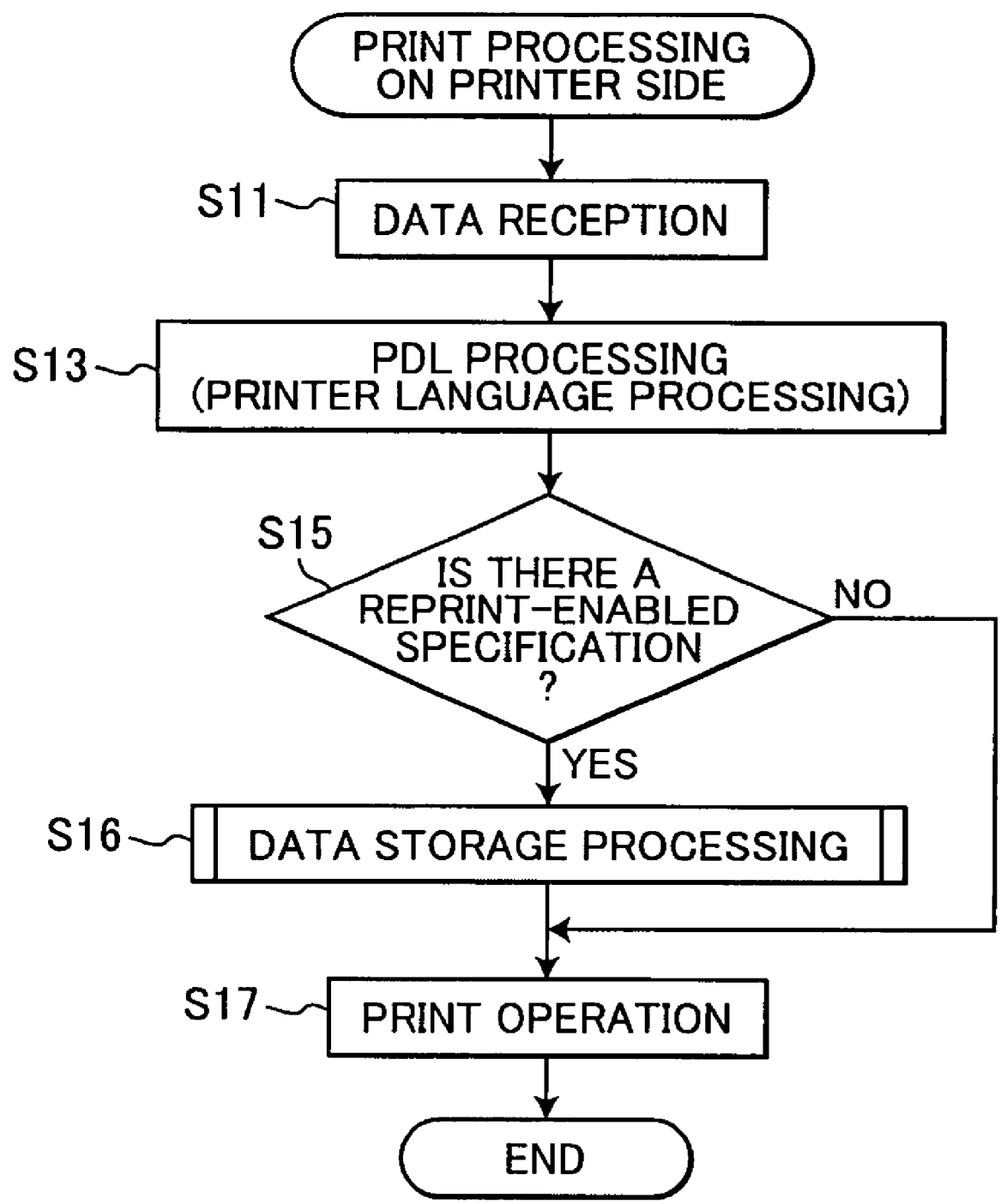
FIG. 8 is a flowchart of print processing on the printer side in accordance with the second embodiment of the invention.

On the printer 40 side, the configuration is such that the data storage operation is not executed on the basis of automatic determination processing, but on whether or not there is a reprint-enabled specification written in the header of the transmitted PDL data, as shown in FIG. 8. Note that the keyword search processing shown in FIG. 5 could be executed during the PDL processing of step S13, in a similar manner to the first embodiment.

While the image forming system according to the present invention has been described in detail with reference to specific embodiments thereof, it would be apparent to those skilled in the art that many modifications and variations may be made therein without departing from the spirit of the invention, the scope of which is defined by the attached claims. For example, the configuration of the above-described embodiments was such that PDL data is stored in the RAM 44 on the printer 40 side, but the invention is not limited thereto. If a hard disk or flash memory is provided on the printer 40 side, the data could be stored therein. In addition, the data storage location is not limited to the printer 40 side; the data could equally well be stored in memory such as the RAM 14 or 24 or the hard disk 16 or 26 on the local computer 10 or the server computer 20 side.

The data format stored in the data storage device, such as the above-described RAM 44, is also not limited to PDL format; it can also be a data format such as one that has been converted into bit-mappable form. Furthermore, this data could also be compressed before storage.

In the above-described embodiments, the configuration was such that the reprint-enabled specification set by the user is done by an input operation in the local computer 10 or server computer 20 side, but the invention is not limited thereto and thus the specification could equally well be done by an operation of the operating panel of the printer 40.

The configuration of the above embodiments was such that data communications were done through the LAN 2, but the invention is not limited thereto and thus the data communications could be done through other communications lines such as over the Internet. It should go without saying that either wired or wireless means could be used therefore.

A program corresponding to the above-described automatic determination processing and keyword search processing could be installed from a recording medium such as a CD, or it could be downloaded over the Internet.

In each of the above-described embodiments, the reprinting is done by an operation of the panel of the printer 40, but the invention is not limited thereto and thus the configuration could also be such that a window screen provided with a selection button for specifying the reprinting could be displayed on the display portion 12 or 22 of the computer from which the request is made, and the reprinting could be done by clicking on that selection button.

The configuration could also be such that reprinting can be selectively specified in page units, not file units.

What is claimed is:

1. An image forming system comprising:

a terminal;

a printing device that is communicable with the terminal and performs a print operation when print data is transmitted from the terminal, the print data including a text portion to be printed;

wherein the terminal includes a first determination unit that determines whether or not to execute a reprint-enabling designation based on whether the print data includes a reprint-enabled specification set by a user, wherein the printing device includes:

a memory;

an acquiring unit that acquires information about the print data, the information acquired by the acquiring unit being at least one of source information about the terminal that has sent the print data to the printing device, user information about a user who has prepared the print data, and data information about a data type of the print data;

a second determination unit that:

determines whether or not to execute the reprint-enabling designation based on the information acquired by the acquiring unit so as to store the print data in the memory as reprint-enabled data, if the first determination unit determines that the print data does not include the user set reprint-enable specification, and determines to execute the reprint-enabling designation so as to store the print data in the memory as the reprint-enabled data, if the first determination unit determines that the print data includes the user set reprint-enabled specification;

a memory control unit that controls the memory to store the print data as the reprint-enabled data when the second determination unit has determined to execute the reprint-enabling designation;

a reprint instruction device that instructs the printing device to perform a reprint operation based on the print data stored in the memory;

a search unit that searches the text portion so as to determine whether or not a specific character string is present in the text portion to be printed and contained in the print data; and a canceling unit that cancels the reprint-enabling designation executed by the second determination unit, wherein when the search unit finds that the specific character string is present in the text portion, the canceling unit cancels the reprint-enabling designation despite the determination of the second determination unit to execute the reprint-enabling designation, whereas when the search unit finds that the specific character string is not present in the text portion, the second determination unit determines to execute the reprint-enabling designation.

2. The image forming system according to claim 1, wherein the terminal includes a header creating unit that creates a header to be attached to the print data, wherein the information is written in the header.

3. The image forming system according to claim 2, wherein the acquiring unit acquires the information from the header.

4. The image forming system according to claim 2, further comprising a reprint specifying device that accepts and retains a user's instruction as to whether or not the print data should be specified as the reprint-enabled data, wherein when the print data is specified as the reprint-enabled data by the user, the second determination unit determines to store the print data in the memory.

5. The image forming system according to claim 4, wherein the user's instruction retained in the reprint specifying device is written in the header, and the acquiring unit acquires the user's instruction from the header.

6. The image forming system according to claim 5, wherein the memory control unit checks whether or not there remains a free storage area for storing the print data in the memory, wherein when checking with the memory control unit indicates that a sufficient free storage area does not remain in the memory, the memory control unit deletes data that has already been stored in the memory in order to store the print data therein.

7. The image forming system according to claim 6, wherein the data to be deleted by the memory control unit includes first category data that is stored in the memory based on the information acquired by the acquiring unit, and second category data that is stored in the memory based on the user's instruction retained in the reprint specifying device, wherein priority is given to the first category data relative to the second category data in deleting the data from the memory.

8. The image forming system according to claim 1, wherein the second determination unit determines not to store the print data in the memory as reprint-enabled data when the search unit determines that the specific character string is present in the text portion.

9. The image forming system according to claim 1, wherein the printing device comprises an operation unit for allowing a user to enter an instruction to perform the reprint operation, and the reprint instruction device instructs the printing device to perform the reprint operation in response to the instruction entered into the operation unit.

10. A printing device communicable with a terminal that includes a first determination unit that determines whether or not to execute a reprint-enabling designation based on whether the print data includes a reprint-enabled specification set by a user, the printing device comprising:

a print portion;

a memory;

an acquiring unit that acquires information about print data transmitted from the terminal, the print data including a text portion to be printed, the information acquired by the acquiring unit being at least one of source information about the terminal that has sent the print data to the printing device, user information about a user who has prepared the print data, and data information about a data type of the print data;

a second determination unit that:

determines whether or not to execute the reprint-enabling designation based on the information acquired by the acquiring unit so as to store the print data in the memory as reprint-enabled data, if the first determination unit determines that the print data does not include the user set reprint-enable specification, and determines to execute the reprint-enabling designation so as to store the print data in the memory as the reprint-enabled data, if the first determination unit determines that the print data includes the user set reprint-enabled specification;

a memory control unit that controls the memory to store the print data as the reprint-enabled data when the second determination unit has determined to execute the reprint-enabling designation;

a reprint instruction device that instructs the print portion to perform a reprint operation based on the print data stored in the memory;

a search unit that searches the text portion so as to determine whether or not a specific character string is present in the text portion to be printed and contained in the print data; and a canceling unit that cancels the reprint-enabling designation executed by the second determination unit, wherein when the search unit finds that the specific character string is present in the text portion, the canceling unit cancels the reprint-enabling designation despite the determination of the second determination unit to execute the reprint-enabling designation, whereas when the search unit finds that the specific character string is not present in the text portion, the second determination unit determines to execute the reprint-enabling designation.

11. The printing device according to claim 10, wherein the information is written in a header attached to the print data and the acquiring unit acquires the information from the header.

12. The printing device according to claim 11, further comprising a reprint specifying device that accepts and retains a user's instruction as to whether or not the print data should be specified as the reprint-enabled data, wherein when the print data is specified as the reprint-enabled data by the user, the second determination unit determines to store the print data in the memory.

13. The printing device according to claim 12, wherein the user's instruction retained in the reprint specifying device is written in the header, and the acquiring unit acquires the user's instruction from the header.

14. The printing device according to claim 13, wherein the memory control unit checks whether or not there remains a free storage area for storing the print data in the memory, wherein when checking with the memory control unit indicates that a sufficient free storage area does not remain in the memory, the memory control unit deletes data that has already been stored in the memory in order to store the print data therein.

15. The printing device according to claim 14, wherein the data to be deleted by the memory control unit includes first category data that is stored in the memory based on the information acquired by the acquiring unit, and second category data that is stored in the memory based on the user's instruction retained in the reprint specifying device, wherein priority is given to the first category data relative to the second category data in deleting the data from the memory.

16. The printing device according to claim 10, wherein the second determination unit determines not to store the print data in the memory as reprint-enabled data when the search unit determines that the specific character string is present in the text portion.

17. The printing device according to claim 10, further comprising an operation unit for allowing a user to enter an instruction to perform the reprint operation, and the reprint instruction device instructs the print portion to perform the reprint operation in response to the instruction entered into the operation unit.

18. A terminal communicable with a printing device, the terminal comprising:
a memory;
an acquiring unit that acquires information about print data to be transmitted to the printing device, the information acquired by the acquiring unit being at least one of source information about the terminal that sends the print data to the printing device, user information about a user who has prepared the print data, and data information about a data type of the print data;
a first determination unit that determines whether or not to execute a reprint-enabling designation based on whether the print data includes a reprint-enabled specification set by the user;
a second determination unit that:
determines whether or not to execute the reprint-enabling designation based on the information acquired by the acquiring unit so as to store the print data in the memory as reprint-enabled data, if the first determination unit determines that the print data does not include the user set reprint-enable specification, and
determines to execute the reprint-enabling designation so as to store the print data in the memory as the reprint-enabled data, if the first determination unit determines that the print data includes the user set reprint-enabled specification;
a memory control unit that controls the memory to store the print data when the second determination unit determines to store the print data in the memory;
a reprint instruction device that instructs the printing device to perform a reprint operation based on the print data stored in the memory; and
a canceling unit that cancels the determination made by the second determination unit to store the print data in the memory as the reprint-enabled data,
wherein:
the print data includes a text portion to be printed,
the acquiring unit comprises a search unit that searches the text portion of the print data to determine whether or not a specific character string is present in the text portion,
the second determination unit determines to store the print data in the memory unless the specific character string is present in the text portion,
the memory control unit controls the memory not to store the print data when the canceling unit cancels the determination made by the second determination unit, and
when the search unit finds that the specific character string is present in the text portion, the canceling unit cancels the determination despite the determination of the second determination unit to store the print data in the memory as the reprint-enabled data, whereas when the search unit finds that the specific character string is not present in the text portion, the second determination unit determines to store the print data in the memory.

19. The terminal according to claim 18, wherein the information is written in a header attached to the print data and the acquiring unit acquires the information from the header.

20. The terminal according to claim 19, further comprising a reprint specifying device that accepts and retains a user's instruction as to whether or not the print data should be specified as the reprint-enabled data, wherein when the print data is specified as the reprint-enabled data by the user, the second determination unit determines to store the print data in the memory.

21. The terminal according to claim 20, wherein the user's instruction retained in the reprint specifying device is written in the header, and the acquiring unit acquires the user's instruction from the header.

22. The terminal according to claim 21, wherein the memory control unit checks whether or not there remains a free storage area for storing the print data in the memory, wherein when checking with the memory control unit indicates that a sufficient free storage area does not remain in the memory, the memory control unit deletes data that has already been stored in the memory in order to store the print data therein.

23. The terminal according to claim 22, wherein the data to be deleted by the memory control unit includes first category data that is stored in the memory based on the information acquired by the acquiring unit, and second category data that is stored in the memory based on the user's instruction retained in the reprint specifying device, wherein priority is given to the first category data relative to the second category data in deleting the data from the memory.

24. The terminal according to claim 18, wherein the second determination unit determines not to store the print data in the memory as reprint-enabled data when the search unit determines that the specific character string is present in the text portion.

25. The terminal according to claim 18, further comprising an operation unit for allowing a user to enter an instruction to perform the reprint operation, and the reprint instruction device instructs the printing device to perform the reprint operation in response to the instruction entered into the operation unit.

26. A non-transitory computer-readable storage medium that stores a reprint execution program for an image forming system including a terminal, a printing device that is communicable with the terminal and performs a print operation when print data is transmitted from the terminal, and a memory, the reprint execution program comprising:

an acquiring program for acquiring information about the print data, the print data including a text portion to be printed, the information acquired by the acquiring program being at least one of source information about the terminal that has sent the print data to the printing device, user information about a user who has prepared the print data, and data information about a data type of the print data;

a first determining program for determining whether or not to execute a reprint-enabling designation based on whether the print data includes a reprint-enabled specification set by the user;

a second determining program for:

determining whether or not to execute the reprint-enabling designation based on the information acquired by the acquiring program so as to store the print data in the memory as reprint-enabled data, if the first determining program determines that the print data does not include the user set reprint-enable specification, and determining to execute the reprint-enabling designation so as to store the print data in the memory as the reprint-enabled data, if the first determining program determines that the print data includes the user set reprint-enabled specification;

a memory control program for controlling the memory to store the print data as the reprint-enabled data when the second determining program has determined to execute the reprint-enabling designation;

an instructing program for instructing the printing device to perform a reprint operation based on the print data stored in the memory, and a search program for searching a text portion contained in the print data to determine whether or not a specific character string is present in the text portion, a third determining program for determining to store the print data in the memory unless the specific character string is present in the text portion, and a canceling program for canceling the reprint-enabling designation by the third determining program, wherein when the search program finds that the specific character string is present in the text portion, the canceling program cancels the reprint-enabling designation despite the determination of the second determining program to execute the reprint-enabling designation, whereas when the search program finds that the specific character string is not present in the text portion, the second determining program determines to execute the reprint-enabling designation.

27. The non-transitory computer-readable storage medium according to claim 26, further comprising a user's instruction accepting program for accepting and retaining user's instruction as to whether or not the print data should be specified as the reprint-enabled data, and a fourth determining program for determining to store the print data in the memory when the print data is specified by the user as the reprint-enabled data.

28. The non-transitory computer-readable storage medium according to claim 26, further comprising a checking program for checking whether or not there remains a free storage area for storing the print data in the memory, and a deleting program for deleting data that has already been stored in the memory when checking with the checking program indicates that a sufficient free storage area does not remain in the memory.

* * * * *